(12) United States Patent
Fix

(10) Patent No.: US 12,167,952 B2
(45) Date of Patent: Dec. 17, 2024

(54) ABUTMENT FOR HOLDING A DENTAL PROSTHESIS TO A JAW IMPLANT, AND METHOD FOR PRODUCING A DENTAL PROSTHESIS

(71) Applicant: MEDENTIKA GMBH, Hügelsheim (DE)

(72) Inventor: Frank Fix, Remchingen (DE)

(73) Assignee: MEDENTIKA GMBH, Hügelsheim (DE)

( * ) Notice: Subject to any disclaimer, the term of this patent is extended or adjusted under 35 U.S.C. 154(b) by 504 days.

(21) Appl. No.: 16/633,447

(22) PCT Filed: Jul. 27, 2018

(86) PCT No.: PCT/EP2018/070468
§ 371 (c)(1),
(2) Date: Jan. 23, 2020

(87) PCT Pub. No.: WO2019/025321
PCT Pub. Date: Feb. 7, 2019

(65) Prior Publication Data
US 2020/0214809 A1    Jul. 9, 2020

(30) Foreign Application Priority Data
Aug. 1, 2017 (EP) .................................. 17184285

(51) Int. Cl.
*A61C 9/00* (2006.01)
*A61C 8/00* (2006.01)

(52) U.S. Cl.
CPC .......... *A61C 9/0053* (2013.01); *A61C 8/0056* (2013.01); *A61C 8/0068* (2013.01); *A61C 8/0069* (2013.01)

(58) Field of Classification Search
CPC ... A61C 9/0053; A61C 8/0056; A61C 8/0068; A61C 8/0069
See application file for complete search history.

(56) References Cited

U.S. PATENT DOCUMENTS 5,863,200 A    1/1999  Hamada et al.
7,303,396 B2 * 12/2007  Abarno ............... A61C 8/0022
                                              433/173

(Continued)

FOREIGN PATENT DOCUMENTS

CN    101 297 772 A    11/2008
DE    20 2012 102746 U1    8/2012

(Continued)

OTHER PUBLICATIONS

Oct. 11, 2018 Search Report issued in International Patent Application No. PCT/EP2018/070468.

(Continued)

*Primary Examiner* — Nicholas D Lucchesi
*Assistant Examiner* — Hao D Mai
(74) *Attorney, Agent, or Firm* — Oliff PLC

(57) ABSTRACT

An abutment for holding a dental prosthesis to a jaw implant, having: an apical section detachably fastening the abutment to the jaw implant, the apical section being structured along a first central axis; a coronal section detachably fastening the dental prosthesis to the abutment, the coronal section being structured along a second central axis, wherein the second central axis extends at an angle to the first central axis; and an indexing element in a shell surface of the coronal section specifying an orientation of a display element that is coupleable to the coronal section for a digital scanning operation, based on an orientation of the first central axis. A display element coupling to an abutment coronal section, and displaying a position and orientation of the abutment for a digital scanning operation, a tooth model (Continued)

system having an abutment and a display element, and a method producing a dental prosthesis.

9 Claims, 4 Drawing Sheets

(56) References Cited

U.S. PATENT DOCUMENTS

| | | | | |
|---|---|---|---|---|
| 7,905,727 | B2* | 3/2011 | Kikuchi | A61C 8/0081 |
| | | | | 433/189 |
| 9,603,678 | B2* | 3/2017 | Mourao | A61C 8/0034 |
| 9,968,424 | B1* | 5/2018 | Kulick | A61C 8/0054 |
| 10,285,787 | B2* | 5/2019 | Bertagnon | A61C 13/0019 |
| 2009/0047630 | A1 | 2/2009 | Ostman et al. | |
| 2012/0295226 | A1* | 11/2012 | Robb | A61C 13/0003 |
| | | | | 433/201.1 |
| 2014/0205969 | A1* | 7/2014 | Marlin | A61C 8/0068 |
| | | | | 433/196 |
| 2016/0151130 | A1* | 6/2016 | Bertagnon | A61C 8/0001 |
| | | | | 433/201.1 |
| 2016/0206408 | A1* | 7/2016 | Spindler | A61C 8/0048 |

FOREIGN PATENT DOCUMENTS

| | | |
|---|---|---|
| DE | 10 2013 013 565 A1 | 1/2015 |
| EP | 0 473 262 A1 | 3/1992 |
| EP | 2 444 028 A1 | 4/2012 |
| EP | 3 363 406 A2 | 8/2018 |
| WO | 2010/150188 A1 | 12/2010 |
| WO | 2018/007316 A1 | 1/2018 |

OTHER PUBLICATIONS

Oct. 11, 2018 Written Opinion issued in International Patent Application No. PCT/EP2018/070468.

Feb. 4, 2020 International Preliminary Report on Patentability issued in International Patent Application No. PCT/EP2018/070468.

Feb. 16, 2021 Office Action issued in European Patent Application No. 18745622.3.

Aug. 3, 2023 Office Action issued in European Patent Application No. 18745622.3.

* cited by examiner

ABUTMENT FOR HOLDING A DENTAL PROSTHESIS TO A JAW IMPLANT, AND METHOD FOR PRODUCING A DENTAL PROSTHESIS

The present invention relates to an abutment for holding a jaw implant, a display element for coupling to the abutment, a tooth model system, and a method for producing a dental prosthesis.

Abutments are used to affix artificial single teeth and groups of single teeth or entire dental prostheses in the mouth of the patient. For this purpose, jaw implants to which the abutments (artificial tooth stumps) are fastened are introduced (screwed) into the jawbone. These may be multiple implants or abutments for an entire dental prosthesis. An abutment represents, so to speak, a type of intermediate piece between a jaw implant and an individually produced dental prosthesis, and is typically connected to the implant and also to the dental prosthesis by screwing.

For producing the dental prosthesis, it is known to capture the oral situation, i.e., the upper and lower jaws (dentition), in three dimensions by means of digital scanners. So-called printed models (tooth or dentition models) may be created from the data sets thus obtained, using 3D printers.

In order to individually produce an implant-supported artificial tooth superstructure (dental prosthesis) for a patient, for the scanning operation a display element (also referred to as a "scanbody" or "scanmarker") is screwed into an implant that is anchored in the jaw of the patient. The scanbody is designed, for example, as a post having one or more faces, and is recognized during the scanning of the dentition. The scanbody renders the exact position and orientation of the implant, and is therefore used for the subsequent precise positioning of an abutment in (or on) the printed model. The dental prosthesis is then created on the abutment in the printed model, and together with the abutment is subsequently screwed into the implant in the patient's jaw.

Depending on the location in the dentition that a dental prosthesis is to be introduced, and how the jawbone of a person is formed, and at which locations in the jaw the jaw implants are situated and/or which angular differences are present between the jaw implants, it is necessary to use angled abutments. Such angled abutments have an apical section that faces the jaw, and that is situated at an angle to a coronal section that faces the dental prosthesis. Different jaw shapes, which require the introduction of implants in various directions, can be dealt with in this way. For jaw shapes and dental prosthesis positions in which only a few locations are suitable for introducing implants, it is often possible to prevent blocking during introduction of the dental prosthesis by the use of abutments having an angled design.

When angled abutments are used, it is absolutely necessary to coordinate the rotational and axial orientations of the individual abutments with one another in their entirety in order to achieve a preferably common axial direction (insertion direction) when the prosthesis is subsequently mounted. However, the position and orientation of the coronal section of an abutment that is fastened to an implant and determinable by means of the scanbody during the digital scanning does not allow conclusions to be drawn concerning the orientation of the apical section or of the implant. This complicates the modeling of the dental prosthesis, since normally it is not possible to acquire data about the gum tissue surrounding the jaw during the scanning operation. This may result in inaccuracies or additional effort for the adaptation when producing the dental prosthesis, since manual intervention is required. For this reason, manual modeling is often preferred over use of a digital scanning operation when angled abutments are used, which may result in greater effort and less accuracy.

DE 10 2013 013 565 A1 discloses a superstructure support and a method for producing same. An artificial crown or a composite made of an adhesive body and a crown is situated on or at the superstructure support. The superstructure support has a first structure, at least in areas, in the area supporting the adhesive body and/or crown. In addition, a second structure is situated on the superstructure support in the area facing the implant body. The superstructure support, as part of a dental prosthesis, may be cost-effectively produced using the disclosed method.

DE 20 2012 102 746 U1 discloses a dental implant assembly system. An abutment attachment for a jaw implant includes a fastening section for fastening the abutment attachment to the jaw implant, and a bonding base, which is laterally offset with respect to the fastening section, for adhesively bonding a crown adhesive body as the base for a dental crown or for adhesively bonding a healing cap adhesive body.

WO 2018/007316 A1 discloses an abutment base for restorative dental treatment. The abutment base includes an implant section, oriented about a first axis, that is mountable on a dental implant, and a crown section, oriented about a second axis, that is fastenable to a dental prosthesis. The two axes of the implant section and of the crown section, respectively, are not aligned with one another. The stop base has a central opening that extends over the entire length thereof, and that is suitable for allowing a tool such as a screwdriver to pass through.

On this basis, the problem arises of minimizing the effort in producing the printed model and improving the accuracy during the production of the dental prosthesis. The aim is to allow a digital scanning operation and (automated) 3D printing of a printed model when angled abutments are used.

This object is achieved by an abutment for holding a dental prosthesis to a jaw implant, having: an apical section for detachably fastening the abutment to the jaw implant, the apical section being structured along a first central axis; a coronal section for detachably fastening the dental prosthesis to the abutment, the coronal section being structured along a second central axis, wherein the second central axis extends at an angle to the first central axis; and an indexing element in a shell surface of the coronal section for specifying an orientation of a display element, which is coupleable to the coronal section for a digital scanning operation, based on an orientation of the first central axis.

The object is further achieved by a display element for coupling to a coronal section of such an abutment, and for displaying a position and orientation of the abutment for a digital scanning operation, having an indexing coupling, corresponding to the indexing element, for specifying the orientation of the display element, the indexing coupling preferably being designed as a protrusion that corresponds to a recess in the circumference of the coronal section.

In a further aspect, the invention relates to a tooth model system having an abutment and a display element as defined above.

Moreover, one aspect of the invention relates to a method for producing a dental prosthesis, having the steps: fastening an abutment as defined above to a jaw implant; coupling a display element as defined above to the abutment; and carrying out a digital scanning operation for capturing the position and orientation of the first central axis of the abutment.

Preferred embodiments of the invention are described in the dependent claims. It is understood that the abutment, the display element, the tooth model system, and the method may have a design that corresponds to the embodiments described for the abutment in the dependent claims.

According to the invention, an indexing element is provided in an angled abutment. The indexing element is situated in the shell surface of the coronal section. A shell surface is understood to mean the outer surface or the circumference of the body. The indexing element lies in this surface. In particular, the indexing element may be designed as a protrusion or as a recess, so that the shell surface has an irregular course. Thus, the shell surface may include, so to speak, a first portion that corresponds to the shell surface or outer surface of an original body, and a second portion that corresponds to a surface that results from taking away (recess) or adding (protrusion) material from/to the original body. It is likewise possible for the indexing element to have a design as a geometric shape in a cross section of the coronal section, for example as a hexagon, octagon, or square.

The indexing element cooperates with a display element (scanbody), and specifies the orientation of the apical section, i.e., the orientation of the jaw implant, for this display element. An orientation of the first central axis is understood herein to mean in particular an angular indication with regard to the position and orientation of the second central axis, which corresponds to the orientation of the display element. The orientation preferably includes the indication of an angle of a projection of the first central axis into a plane that extends perpendicularly with respect to the second central axis. Apart from the indication of an angle, the orientation may also be determined in some other way. The orientation of the first central axis is unambiguously specified by means of such an angle, and based on a known angle between the two central axes. The indexing element in the shell surface of the coronal section is indexed with respect to the apical section.

In conventional abutments or display elements, in which the coronal section usually has a conical design, it is possible for the display element to rotate about the second central axis. Thus, based on the capture by the display element, only the position of the abutment and the orientation of the second central axis, but not the orientation of the first central axis, can be determined.

In contrast, according to the invention, in addition to the (three-dimensional) position in the mouth and the orientation of the second central axis, it is also possible to determine the orientation of the first central axis or of the jaw implant. A display element that is coupled to the abutment is oriented by means of the indexing element. As a result of the indexing element an unambiguous orientation of the display element on the abutment is specified, so that, based on the orientation of the display element, it is also possible to calculate the orientation of the first central axis.

For this purpose, according to the invention the indexing element may cooperate with an appropriate, correspondingly designed indexing coupling on the display element. Due to a form fit, the indexing element and the indexing coupling specify the orientation of the display element, based on the orientation of the apical section or the first central axis. The orientation of the first central axis may be calculated based on the orientation of the display element that is determinable in the scanning operation.

As a result, a conclusion may be drawn concerning the shape of the jaw and the course and orientation of the implants, based on the data set from the scanning operation, and a dental prosthesis may be appropriately adapted. In particular, corresponding flesh-colored panels which are in direct contact with the gum may be provided in the areas of the dental prosthesis. This allows the entire printed model to be created in a 3D printing operation, based on the data captured in the digital scanning operation. In addition, abutments may be removed from the model or the oral situation at any time and precisely replaced in exactly the same orientation.

The invention allows digital operations. A digital scanning operation may be used to automatically generate a printed model. The effort in producing the printed model and the dental prosthesis is thus minimized. A high-quality dental prosthesis may be produced due to the capability for precisely adapting the panels to the human jaw or gum.

The indexing element is preferably designed as a first recess in the circumference of the coronal section. A recess is understood in particular to mean an indentation or a depression in the shell surface. The positioning in the circumference means that a partial section of a body that is rotationally symmetrical per se is withdrawn or removed. Thus, a portion of the original shell surface or of the material is absent in the coronal area. It is advantageous in particular that compatibility with standard coupling sites on a dental prosthesis is maintained, since with respect to the original shape, material is only taken away, not added.

In another advantageous embodiment, the abutment includes a second indexing element that is designed as a second recess in the circumference of the coronal section. The presence of two indexing elements ensures a high level of positioning certainty when the display element is coupled to the abutment. Typical abutments have a size in the range of several millimeters. A coronal section of a conventional abutment may have a diameter, for example, of approximately 5 mm in a plane perpendicular to the second central axis. To establish a form fit between the recess and the corresponding protrusion on the display element, it is advantageous to use two recesses, which increases the stability and maintains the positioning certainty.

In one advantageous embodiment, in order to unambiguously specify the orientation of the coupleable display element, the first recess and the second recess have different sizes and different shapes, and/or are situated at an angle different from 180° with respect to the second central axis. To prevent rotation, and thus an ambiguous orientation, of the display element, the two recesses may have different sizes or different shapes, or may also be situated at an angle different from 180° with respect to one another. All options allow the display element to be coupled to the abutment only when the display element is placed in the defined position. An unambiguous coupling is thus achieved.

Furthermore, the coronal section advantageously includes a truncated cone-shaped area in which the indexing element is situated and which widens in the direction of the apical section. So-called multi-unit abutments have become established as a type of industry standard in the field of abutments. In this type of multi-unit, an interface for coupling to the dental prosthesis is present in the coronal section. A truncated cone-shaped or also a cone-shaped area that widens in the direction of the apical section is preferably provided for this purpose. Such a truncated cone-shaped area provides compatibility between the abutment and the dental prosthesis. Due to the truncated cone-shaped design, a concentric arrangement of the coronal section and the protrusion in the dental prosthesis is achieved when a screw connection is tightened.

The dental prosthesis is automatically positioned during the fastening by screwing. According to the invention, the indexing element is situated in the truncated cone-shaped area. A concentric arrangement of the display element and the coronal section may thus be ensured, also during the coupling of the display element.

Moreover, a delimiting surface of the first and/or second recess advantageously extends parallel to the second central axis. A delimiting surface is understood to mean a portion of the shell surface of the abutment in the coronal section. The delimiting surface delimits the recess from the coronal area of the abutment, and thus forms the outer shape of the recess. Starting from a coronal area that is originally rotationally symmetrical, and from which a portion is removed to produce the indexing element, the result is the delimiting surface as that surface or portion of the shell surface that is newly created by the recess. This delimiting surface extends parallel to the second central axis. The display element may thus be mounted when the display element is coupled to the abutment. The recess has preferably little influence on the stability of the abutment due to use of a delimiting surface having such a design. Preferably little material is removed in the coronal section. The stability of the abutment is largely maintained, in particular in its coronal section. In addition, good manufacturability is ensured.

In one preferred embodiment, the delimiting surface includes an undulated structure that is preferably symmetrical with respect to a plane of symmetry of the first and/or second recess. An undulated structure is understood to mean a uniformly curved structure having multiple peaks and troughs. The parallel orientation of the delimiting surface with respect to the second central axis is hereby maintained. The delimiting surface is undulated in a direction extending perpendicular to and at a distance from the second central axis. A good form fit between the recess and the corresponding protrusion on the display element may be ensured by using an undulated structure, since the contact surface is enlarged and the unambiguousness of the coupling is ensured. The plane of symmetry of the recess extends parallel to the second central axis.

In another advantageous embodiment, the abutment includes a stop surface, which is oriented perpendicularly with respect to the second central axis and circumferentially surrounds the second central axis, for applying the dental prosthesis. Such a stop surface ensures that the dental prosthesis as well as the display element are fixedly connectable to the abutment with an unambiguous orientation during the digital scanning operation. A stop surface of the dental prosthesis or on the display element, having such a design, rests against the stop surface of the abutment. This ensures stable anchoring of the dental prosthesis and also of the display element.

Furthermore, the abutment advantageously includes a shoulder, extending parallel to the stop surface, between the indexing element and the stop surface. The shoulder between the indexing element and the stop surface is advantageous in particular when a recess, which is usually produced in a milling operation, is provided as an indexing element. Such a milling operation requires a tolerance in the milling-off procedure. To ensure that the stop surface is not damaged, a shoulder, which so to speak represents a safety buffer for tolerances during milling of the recess, is maintained between the stop surface and the recess. This ensures that the stop surface is not damaged or scratched. The production costs and reject costs are minimized.

In another embodiment, the abutment includes a first borehole, extending through the coronal section and the apical section along the first central axis, for receiving a fastening element for fastening the abutment to the jaw implant, wherein the first borehole penetrates a shell surface of the coronal section, and a diameter of the first borehole in the apical section is preferably smaller than a diameter of the first borehole in the coronal section. A fastening element, in particular a screw, for fastening the abutment to the jaw implant through the abutment may be introduced through the first borehole. Since the abutment is angled, the borehole penetrates the shell surface in the coronal section. Access is provided through this borehole, which penetrates the shell surface, for insertion and tightening of the screw. Due to the different diameters in the apical and coronal sections, the screw head may be seated within the abutment. Since the borehole has different dimensions depending on the abutment type, the borehole is not usable as an indexing element. The indexing coupling in the display element is always the same, since the display element is to be manufactured with the same shape in a standardized manner. In addition, due to the small overall size of the abutment in the millimeter range, inaccuracies or even damage may result during coupling of the display element. The indexing element must therefore have a certain stability. The borehole that penetrates the shell surface results in edges in the circumference of the coronal section that do not provide this stability. Therefore, the borehole cannot be used as an indexing element for stability reasons as well.

In one advantageous embodiment, a segment of the shell surface of the coronal section that is interrupted by the first borehole is smaller than a segment of the shell surface of the coronal section that is interrupted by the first recess. This ensures unambiguous positioning of the display element. The indexing coupling is prevented from being accommodated in the first borehole, which could result in ambiguity.

The abutment preferably includes a second borehole, extending through the coronal section along the second central axis, having an internal thread for screwing on the dental prosthesis. The dental prosthesis is normally screwed directly into the second borehole. Simple mounting of the dental prosthesis may be ensured by use of an internal thread.

It is understood that the features stated above and to be explained below may be used not only in the particular stated combination, but also in other combinations or alone without departing from the scope of the present invention.

The invention is described in greater detail below with reference to several selected exemplary embodiments, in conjunction with the appended drawings, which show the following:

Figure 1:
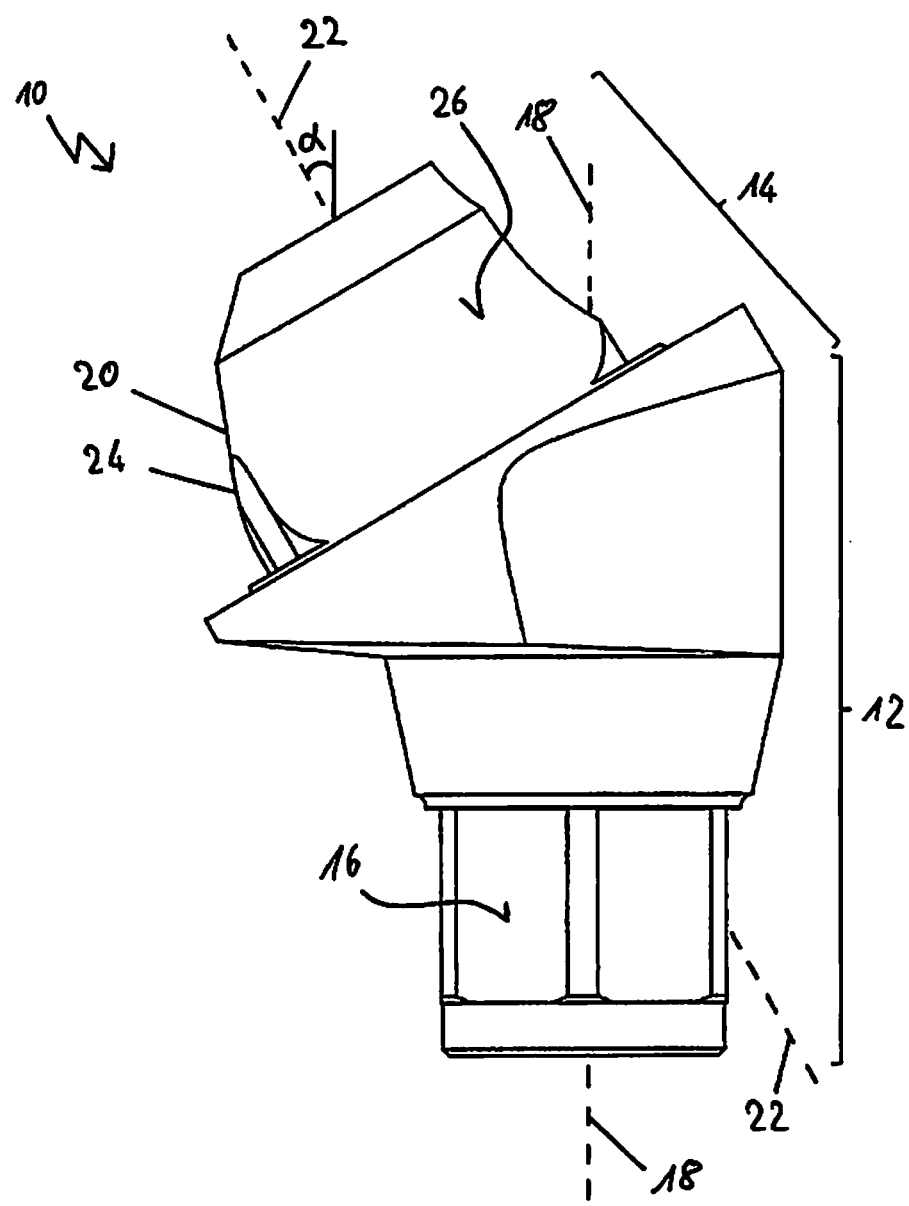
FIG. 1 shows a schematic perspective side view of an abutment according to one aspect of the present invention.

FIG. 1 illustrates an abutment 10 according to the invention for holding a dental prosthesis in a jaw implant. The abutment 10 includes an apical section 12, i.e., a section that faces the jaw and is fastened to the jaw implant. The abutment 10 also includes a coronal section 14, i.e., a section that faces the dental crown or the dental prosthesis and is fastened to the dental prosthesis. The two sections 12, 14 of the abutment 10 are fixedly connected to one another and constitute parts of a body.

The apical section 12 has an essentially cylindrical design, wherein in the area of the coupling to the jaw implant in the illustrated embodiment, multiple flat outer surfaces 16 are provided that cooperate with a correspondingly designed jaw implant in order to prevent rotation of the abutment 10 with respect to the jaw implant. The apical section 12 is structured along a first central axis 18. The first central axis 18 is a vertical line in the illustration shown.

The coronal section 14 includes a truncated cone-shaped area 20 which as a cone engages with a correspondingly shaped protrusion in the dental prosthesis and is fastenable to the dental prosthesis. The coronal section 14 is structured along a second central axis 22 which is at an angle to the first central axis 18. The angle between the central axes is to be selected so that the two central axes 18, 22 do not extend in parallel to one another. Both central axes 18, 22 preferably lie in a plane, so that a point of intersection of the central axes is present.

It is understood that the apical section 12 as well as the coronal section 14 are normally not structured rotationally symmetrically with respect to their central axes. However, both sections have an essentially cylindrical design.

The present invention relates to angled abutments, i.e., abutments in which the first central axis 18 and the second central axis 22 are at an angle α relative to one another. Examples of typical angles are 15°-45°, 20°-40°, 25°-35°, preferably 30°. It is understood that other angles are also possible and advantageous. The angular position of the two central axes 18, 22 allows the abutment 10 to also be used for jaw shapes that permit little play with regard to the positioning and orientation of the jaw implant, and for which it is necessary for multiple jaw implants to be introduced into the jaw in different directions. Angled abutments are likewise used when the position of the jaw implants is specified within narrow limits due to the size and type of the required dental prosthesis.

The illustrated embodiment of the abutment 10 according to the invention is designed as a so-called multi-unit abutment. This multi-unit has become established as a quasi-standard that is offered by various manufacturers and is characterized in particular by the truncated cone-shaped area 20 in the coronal section 14. The connection sites correspondingly provided on the dental prosthesis are usually designed as recesses which accommodate the coronal section of the abutment and in which the coronal section is anchored.

The abutment 10 according to the invention includes an indexing element 24 that is situated in a shell surface 26 of the coronal section 14. In the illustrated exemplary embodiment, the indexing element 24 is designed as a first recess in the circumference of the coronal section 14. A portion of the truncated cone is milled off parallel to the second central axis 22. Due to the indexing element 24 being designed as such a recess, the coronal section 14 may be additionally fitted into the same opening in a dental prosthesis. At the location of the first recess, only a cavity results within the opening in the dental prosthesis. However, it is not necessary to adapt the dental prosthesis or the further production process, and compatibility remains ensured.

Figure 2:
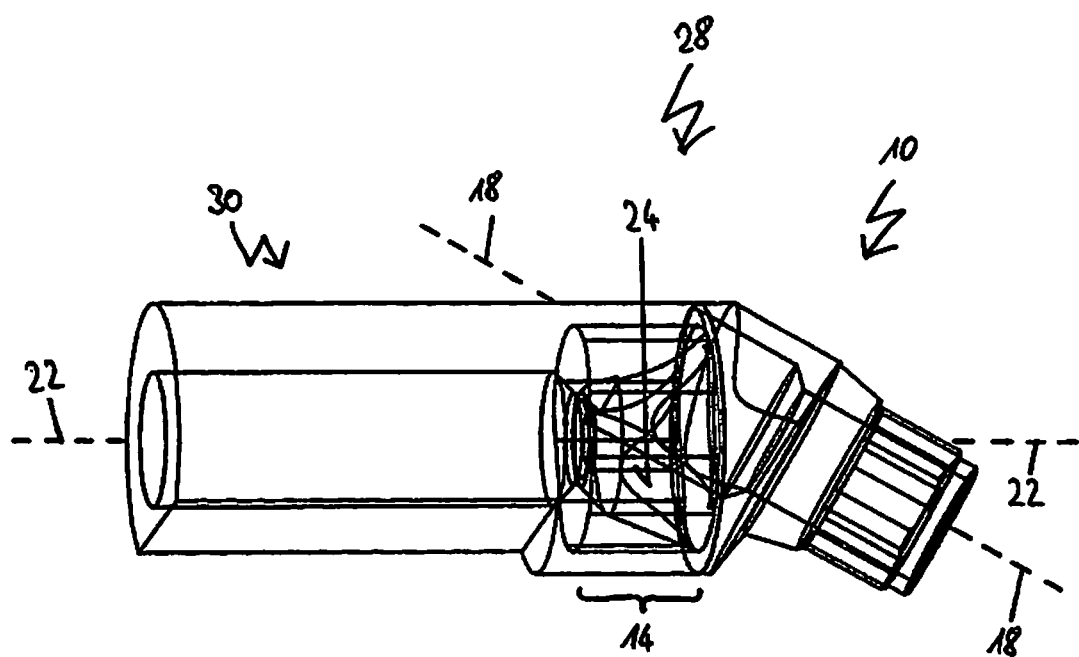
FIG. 2 shows a schematic illustration of a tooth model system according to the invention.

FIG. 2 illustrates a tooth model system 28 according to the invention. In addition to the abutment 10, the tooth model system 28 includes a display element 30 which may be coupled to the coronal section 14 in a digital scanning operation for producing a printed model. To allow production of the dental prosthesis, it is usually necessary to provide modeling for the situation in the jaw of the patient. For this purpose, on the one hand an impression may be taken, and on this basis a model may be manually produced. On the other hand, it is possible and customary nowadays to carry out a digital scanning operation in which automatic, scanning capturing of the situation is carried out. A computer model is created, on the basis of which a 3D print may then be generated.

For this digital scanning operation, a display element 30 (scanbody) is coupled to the abutment 10. The display element 30 is scanned and is recognized by means of an appropriate computer program, and may then be used as the basis for determining the position of the abutment and the orientation of the second central axis.

In tooth model systems thus far, it has not been possible to determine the position or the orientation of the first central axis 18 in relation to the second central axis 22, based on a scan of the display element 30. The second central axis 22 corresponds to a central axis of the display element 30. However, due to the cone-shaped design of the coupling it has been possible to rotate the display element, in the coupled state, about the second central axis. It has not been possible to draw conclusions concerning the orientation of the first central axis, and thus the location of the abutment or the position of the jaw implant, based on the orientation and position of the coronal area or of the second central axis that are detectable during the scanning. This rotation is prevented by the indexing element 24.

The position and orientation of the display element 30 relative to the abutment 10 or its second central axis 18 are unambiguous due to the use of the indexing element 24. Thus, it is possible to draw conclusions concerning the orientation of the first central axis 18 based on the position and orientation of the first central axis 18, which corresponds to the position and axis of the display element 30. The orientation may be determined in the form of an angle in a plane perpendicular to the second central axis 22. The orientation may be indicated in Cartesian or polar coordinates and corresponding reference systems. The processing preferably takes place in an automated manner. As a result, the abutment according to the invention 10 may be used with standard prostheses that have indentations or a blind hole for attachment to multi-unit abutments.

Figure 3:
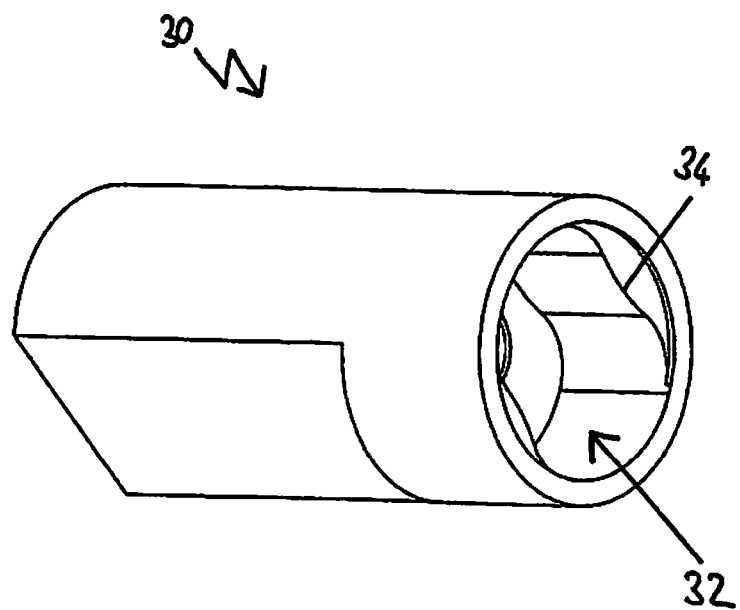
FIG. 3 shows a schematic perspective illustration of a display element according to one aspect of the present invention.

FIG. 3 illustrates such a display element 30 in a perspective view. In particular, the display element 30 includes a coupling area 32 in the form of an opening in which the coronal section of the abutment 10 may be accommodated. Situated within this coupling area 32 is an indexing coupling 34 that corresponds to the indexing element 24 on the abutment. In this regard, the indexing coupling 34 preferably corresponds to a protrusion in a coupling area 32 of a display element 30.

Figure 4:
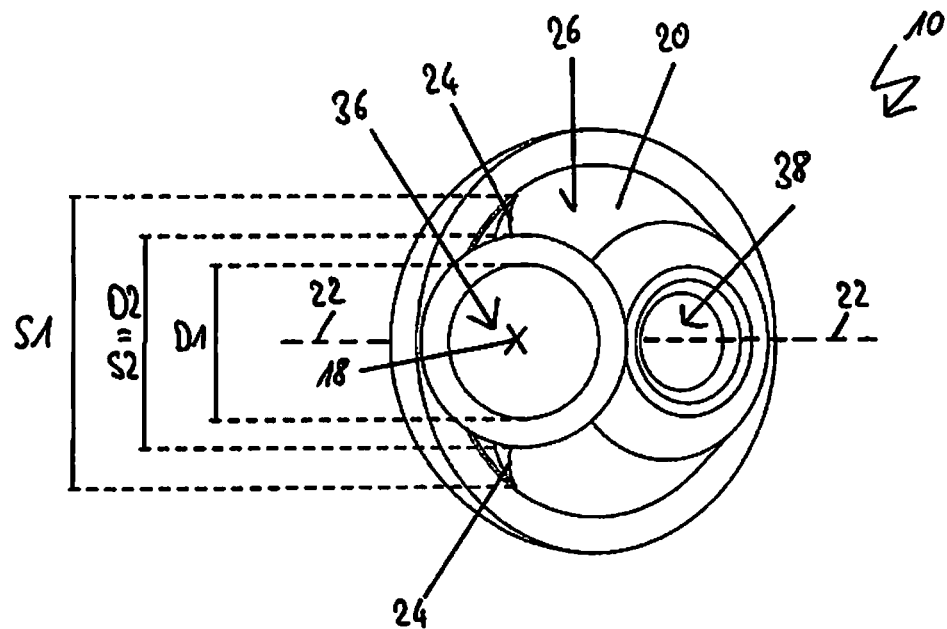
FIG. 4 shows an abutment according to the invention in a view perpendicular to the first central axis.

FIG. 4 illustrates a view of the abutment 10 according to the invention in the direction of the first central axis 18. Both the apical section 12 and the coronal section 14 are traversed by a first borehole 36 that extends along the first central axis 18 and is situated concentrically with respect to same. The first borehole 36 is used to receive a fastening element via which the abutment 10 may be fastened to the jaw implant. A detachable fastening is understood in particular to mean screwing on. However, other types of fastening or coupling are also conceivable.

A screw is preferably used for the fastening. The head of the screw is preferably accommodated within the abutment 10 in such a way that a diameter D1 of the first borehole in the apical section of the abutment is smaller than a diameter D2 of the first borehole in the coronal section. The screw head then rests on the shoulder thus created, and is situated within the abutment 10.

A second borehole 38 that extends along the second central axis 22 is provided for fastening the abutment 10 to the dental prosthesis. The second borehole 38 includes an internal thread. A screw that fixes a dental prosthesis or also a display element to the abutment 10 may engage with the internal thread. It is understood that some other fastening means may also be used.

As illustrated, the first borehole 36 passes through the shell surface 26 of the coronal section. An indexing element 24 designed as a recess is provided in the exemplary embodiment of the abutment 10 shown. The recess is situated in the truncated cone-shaped area 20 in the coronal section of the abutment 10. A partial section of the truncated cone is absent, resulting in a delimiting surface.

The indexing element 24 or the recess is dimensioned in such a way that a segment S1 of the shell surface 26 that is interrupted by the recess is larger than a segment S2 of the shell surface 26 that is interrupted by the first borehole 36; in the illustrated example, the interrupted segment S2 in its maximum extension perpendicular to the first central axis 18 corresponds to the diameter D2 of the first borehole 36 in the coronal section 14. The indexing element 24 is divided, so to speak, into two portions by the first borehole 36. This size relationship ensures that the indexing coupling of the display element 30 cannot engage with the interruption in the shell surface 26 of the coronal section formed by the first borehole 36. This results in unambiguous positioning of the display element 30.

Figure 5A:
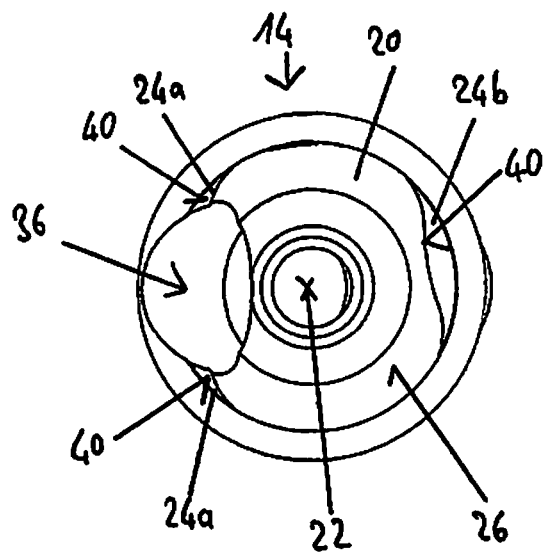
FIG. 5a shows an illustration of a first embodiment of an abutment according to the invention in a view perpendicular to the second central axis.
Figure 5B:
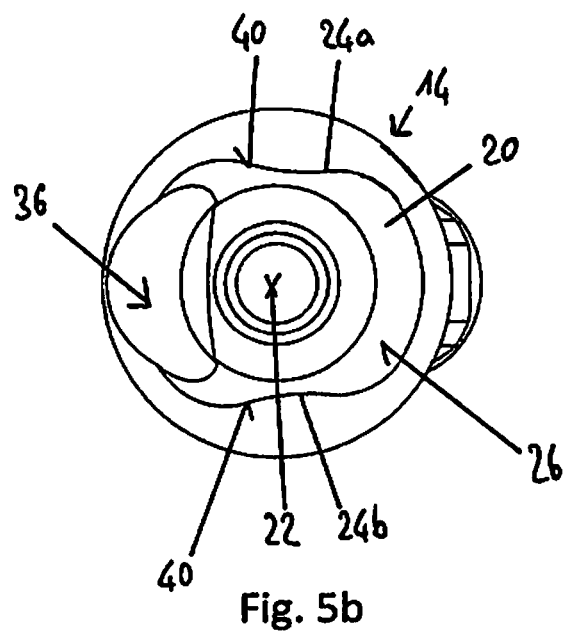
FIG. 5b shows an illustration of a second embodiment of an abutment according to the invention in a view perpendicular to the second central axis.

FIGS. 5a and 5b illustrate two embodiments of an abutment 10 according to the invention, in which two indexing elements 24 are situated in each case in the shell surface 26 of the coronal section. FIGS. 5a and 5b each illustrate a top view of the coronal section 14 in the direction of the second central axis 22. For an unambiguous description, reference is made below to a first indexing element 24a and a second indexing element 24b, it being understood that these designations are interchangeable.

Due to the use of two indexing elements, it is not possible for an individual indexing coupling to inadvertently engage in the first borehole 36, which could result in an ambiguous coupling of the display element 30.

In both FIG. 5a and FIG. 5b, the indexing elements 24a, 24b are designed as recesses in the circumference of the coronal section 14 or in the shell surface 26 of the coronal section 14. Such recesses may be produced by milling. The recesses have a delimiting surface 40 that extends parallel to the second central axis 22. In both of the illustrated embodiments, each of the delimiting surfaces 40 has an undulated structure in a view perpendicular to the second central axis 22, as illustrated in FIGS. 5a and 5b. The undulated structure is preferably symmetrical with respect to a plane of symmetry that is spanned by the second central axis 22 and a midpoint of the recess.

In FIG. 5a, the first indexing element 24a is situated in the area of the first borehole 36. The indexing element 24a is designed as a recess in the circumference of the coronal section 14, the recess in the illustrated exemplary embodiment being interrupted by the first borehole 36, so that the indexing element 24a is divided into two portions. Portions of the recess are situated on each side of the first borehole 36. The second indexing element 24b, which likewise is designed as a recess in the circumference of the coronal section 14, is situated in another portion of the shell surface 26.

In the illustrated embodiment, the two indexing elements 24a, 24b have different sizes. In this regard, a different size means that portions of the truncated cone-shaped area 20 having different sizes have been withdrawn or removed in each case. On the one hand it is necessary for an indexing element to have a sufficiently large support surface for resting against a corresponding indexing coupling in the display element 30 to ensure that wobbling or damage is avoided. On the other hand, the stability of the abutment must be maintained so that only an amount of material that does not endanger the stability is allowed to be removed.

In addition, the rotatably fixed, unambiguous attachment capability of the display element 30 must be ensured. For this purpose, in the illustrated embodiment it is provided that the two indexing elements 24a, 24b are not opposite one another with respect to the second central axis 22, but instead are situated at an angle that is different from 180°. In addition, the two indexing elements 24a, 24b have different sizes.

The differently sized indexing elements 24a, 24b, situated at an angle that is different from 180°, ensure that the display element 30 cannot be rotated when it is mounted on the coronal section 14. The display function remains unambiguous. It is understood that it would alternatively or additionally likewise be possible to use different shapes (not shown).

FIG. 5b illustrates an alternative arrangement of the two indexing elements 24a, 24b. The indexing elements 24a, 24b are likewise situated in the circumference or in the shell surface of the coronal section 14 at an angle that is different from 180°. However, both indexing elements 24a, 24b have the same size. A nonrotatable coupling to the display element 30 is likewise ensured by the arrangement at an angle that is different from 180°.

Figure 6:
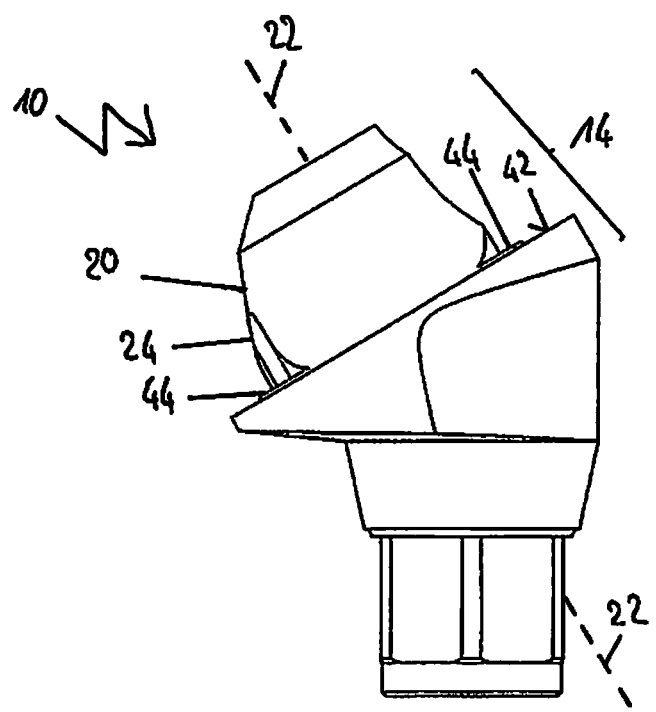
FIG. 6 shows a side view of an abutment according to the invention.

FIG. 6 illustrates a side view of the abutment 10. A stop surface 42 that circumferentially surrounds the second central axis 22 is provided for attaching the abutment 10 to the dental prosthesis. The second central axis 22 is perpendicular to the stop surface 42.

A portion of the truncated cone-shaped area 20 of the coronal section 14 is milled off during production of the indexing element 24. To ensure that the stop surface 42 is not damaged during this milling operation, a shoulder 44 that extends parallel to the stop surface 42 is provided between the indexing element 24 and the stop surface 42. The height of this shoulder 44 is several microns above the stop surface 42. In this regard, the shoulder 44 represents a remainder of the truncated cone-shaped area 20 in the area of the indexing element 24.

As a result, the dental prosthesis may be placed against the stop surface 42 without damage by the shoulder 44. The shoulder 44 must be taken into account and appropriately milled out during the construction of the display element and the corresponding indexing coupling. It is ensured that the stop surface 42 is not damaged or scratched during production of the indexing element 24.

The invention has been explained in detail with reference to the drawings and the description. The description and explanation are to be understood as an example, and are not to be construed as limiting. The invention is not limited to the disclosed embodiments. Other embodiments or variations result for those skilled in the art for use of the present invention and for a precise analysis of the drawings, the disclosure, and the subsequent patent claims.

In the patent claims, the words "include" and "have" do not exclude the presence of further elements or steps. The indefinite article "a" or "an" does not exclude the presence of a plurality. An individual element or an individual unit may carry out the functions of multiple units mentioned in the patent claims. The mere statement of several measures in multiple various dependent patent claims is not to be construed such that a combination of these measures likewise cannot be advantageously used. Reference numerals in the patent claims are not to be construed as limiting.

The invention claimed is:

1. An abutment for holding a dental prosthesis to a jaw implant, having:
   an apical section for detachably fastening the abutment to the jaw implant, the apical section being structured along a first central axis;
   a coronal section being adapted and configured for detachably fastening the dental prosthesis directly to the abutment and for detachably fastening a display element used for a digital scanning operation, the coronal section being constructed along a second central axis, wherein the second central axis extends at an angle to the first central axis;
   a bore in the coronal section extending along the second central axis and having an internal thread adapted to engage a screw for releasably securing the display element to the abutment;
   a first indexing element in a shell surface of the coronal section for specifying an exact orientation of the display element that is coupleable to the coronal section for the digital scanning operation, based on an orientation of the first central axis; and
   a second indexing element that is designed as a second recess in the circumference of the coronal section, the second recess extends to an end of the coronal section adjacent to the apical section, wherein:
   the coronal section encloses a tapered frustoconical region which widens in the direction of the apical section and in which the first indexing element is arranged,
   the first indexing element is designed as a first recess in the circumference of the coronal section and the first recess extends to the end of the coronal section adjacent to the apical section, and
   the first recess and the second recess are spaced from each other.

2. The abutment according to claim 1, wherein in order to unambiguously specify the orientation of the display element, the first recess and the second recess have different sizes and different shapes, and/or are situated at an angle different from 180° with respect to the second central axis.

3. The abutment according to claim 1, wherein a delimiting surface of the first and/or second recess extends parallel to the second central axis.

4. The abutment according to claim 3, wherein the delimiting surface includes an undulated structure that is symmetrical with respect to a plane of symmetry of the first and/or second recess.

5. The abutment according to claim 1, having a stop surface, which is oriented perpendicularly with respect to the second central axis and circumferentially surrounds the second central axis completely, for applying the dental prosthesis.

6. The abutment according to claim 5, having a shoulder, extending parallel to the stop surface, between the first indexing element and the stop surface.

7. The abutment according to claim 1, having
   a first borehole, extending through the coronal section and the apical section along the first central axis, for receiving a fastening element for fastening the abutment to the jaw implant, wherein
   the first borehole penetrates a shell surface of the coronal section; and
   a diameter of the first borehole in the apical section is smaller than a diameter of the first borehole in the coronal section.

8. The abutment according to claim 1, having
   a first borehole, extending through the coronal section and the apical section along the first central axis, for receiving a fastening element for fastening the abutment to the jaw implant, wherein
   the first borehole penetrates a shell surface of the coronal section; and
   a diameter of the first borehole in the apical section is smaller than a diameter of the first borehole in the coronal section, wherein
   a segment of the shell surface of the coronal section that is interrupted by the first borehole is smaller than a segment of the shell surface of the coronal section that is interrupted by the first recess.

9. A tooth model system, having
   the abutment according to claim 1; and
   the display element detachably coupling to the coronal section of the abutment and for displaying a position and orientation of the abutment for the digital scanning operation, the display element including:
   a through hole extending along a longitudinal axis and having a coupling area at an end of the display element, the coupling area being configured to couple with the coronal section,
   an indexing coupling, corresponding to the first indexing element, for specifying the exact orientation of the display element,
   wherein the indexing coupling is located inside the through hole in the coupling area and is designed as a protrusion that corresponds to the first recess in the circumference of the coronal section.

* * * * *